United States Patent [19]

Park

[11] Patent Number: 5,028,182

[45] Date of Patent: Jul. 2, 1991

[54] VACUUM ABSORPTION DEVICE FOR USE IN GLASS SHEET CHAMFERING APPARATUS

[76] Inventor: Kyung Park, 305-1109 Jugong Apt. 670 Daichi-Dong, Kangnam-Ku, Seoul, Rep. of Korea

[21] Appl. No.: 498,816

[22] Filed: Mar. 23, 1990

[51] Int. Cl.⁵ .......................... B23C 3/04; B24B 9/00
[52] U.S. Cl. ........................................ 409/225; 51/235; 269/21
[58] Field of Search .......... 409/219, 161, 225; 51/277, 215 E, 235, 283 E; 269/21, 22; 279/3; 240/363

[56] References Cited

U.S. PATENT DOCUMENTS

| | | | |
|---|---|---|---|
| 1,119,111 | 12/1914 | Pellow et al. | 51/235 |
| 1,384,278 | 7/1921 | Slocombe | 51/235 |
| 4,221,356 | 9/1980 | Fortune | 269/21 |
| 4,493,167 | 1/1985 | Bovone | 409/161 |
| 4,669,226 | 6/1987 | Mandler | 269/22 |

FOREIGN PATENT DOCUMENTS

| | | | |
|---|---|---|---|
| 403238 | 9/1924 | Fed. Rep. of Germany | 51/235 |
| 1092344 | 11/1960 | Fed. Rep. of Germany | 51/235 |
| 3714291 | 12/1988 | Fed. Rep. of Germany | 51/283 E |
| 9026 | of 1896 | United Kingdom | 51/235 |
| 120697 | 11/1918 | United Kingdom | 51/235 |

Primary Examiner—William Briggs
Attorney, Agent, or Firm—Brooks & Kushman

[57] ABSTRACT

An improved vacuum absorption device for use in a glass sheet edge chamfering apparatus is disclosed which is characterized in that rubber plates are installed on the tops of the absorption devices to absorption-secure glass sheets, thereby assuring that the introduction of foreign materials into the absorption device can be prevented, and the horizontal posture of the glass can be maintained through the adjustments of the heights of the absorption devices.

1 Claim, 4 Drawing Sheets

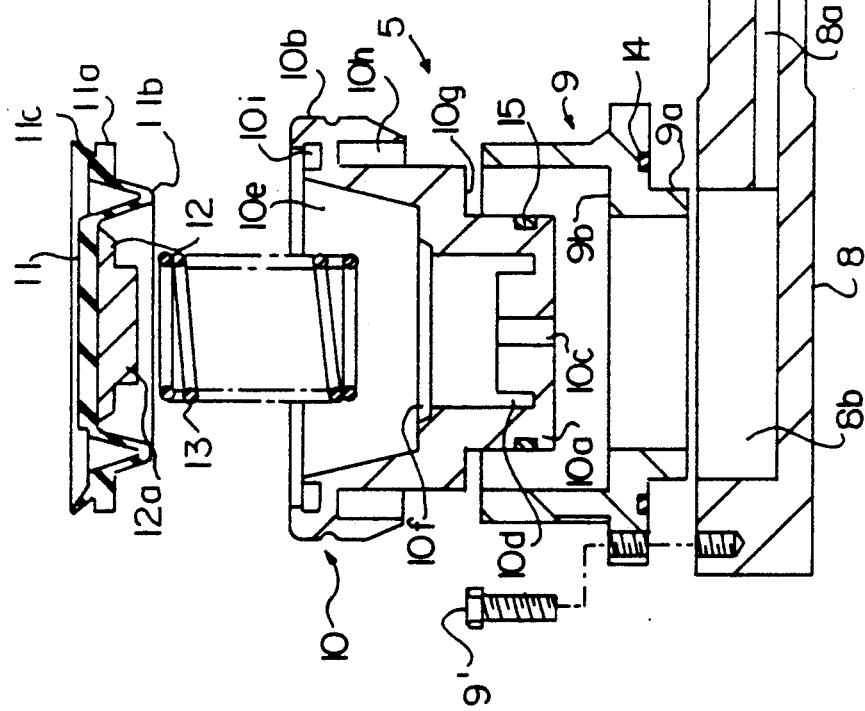

VACUUM ABSORPTION DEVICE FOR USE IN GLASS SHEET CHAMFERING APPARATUS

FIELD OF THE INVENTION

The present invention relates to an improved vacuum absorption device for use in a glass sheet chamfering apparatus which is used in chamfering the sharp edges of cut glass sheets to smooth forms.

BACKGROUND OF THE INVENTION

Generally, as shown in FIG. 1, the conventional glass sheet chamfering apparatus which includes vacuum absorption devices is constituted such that a rotary table 3 is installed by securing a vertical pole 2 on the top of a body 1 in which an absorption pump is accommodated; a plurality of absorption devices 5 are installed on the rotary table 3 in such a manner that they should communicate with the absorption pump; a glass sheet 6 to be chamfered is mounted on the tops of the absorption devices 5 before the absorption pump is activated to vacuum-absorb the glass sheet 6; and a diamond wheel 4 which is disposed at a side of the body 1 is adjusted to the required bevel angle so that the glass sheet 6 can be ground. As shown in FIG. 2A, an O-ring 16 is secured on the top of a cylindrical body 10' of the absorption device 5 conventionally, and then, the glass sheet 6 is mounted on the O-ring in such a manner that the inside of the O-ring should be sealed off with respect to the outside, thereafter the absorption pump being activated to absorption-secure the glass sheet.

When such an absorption device 5 is used for a long time, the O-ring 16 is worn out or contracted due to the continuous contact of the O-ring 16 with the glass sheet 6, with the result that small gaps are generated between the O-ring 16 and the glass sheet 6. In turn, this brings the consequence that glass powders and diamond wheel powders produced during the chamfering are introduced into the cooling fluid to be absorbed into the absorption pump, with the result that the cylinder is worn off or corroded. This again brings the result that the performance of the pump is deteriorated or the life expectancy of the pump is shortened. Further, the horizontal posture of the glass sheet is distorted, and the edge of the glass sheet is chamfered with an irregular form, thereby degrading the commerical merit of the products. Still further, in the case where a glass sheet having a size smaller than the extent of disposition of the absorption devices on the rotary table is to be chamfered, the suction holes 10' a of the cylindrical body 10' of some of the absorption devices 5 are open, so that they have to be closed with separate closures.

In order to overcome these problems, a measure have been attempted recently as described below. That is, as shown in FIG. 2B, an actuation rod 17 having a diameter smaller than that of the suction hole 10' a and provided with an internal packing 19 is installed by means of a spring within the interior of the cylindrical body 10' of the absorption device 5, in such a manner that the leading end of the actuation rod should be located higher than the O-ring 16. Thus, the packing 19 is let to close the suction hole 10' a through the elastic force of the spring 18, while, upon mounting of the glass sheet 6, the actuation rod 17 is lowered due to the gravity of the glass sheet, and at the same time, the glass sheet 6 is adhered on the O-ring 16.

However, in this method also, the suction hole 10' a is open throughout the chamfering process, and therefore, the introduction of the foreign materials can not be absolutely prevented.

SUMMARY OF THE INVENTION

The present invention is intended to overcome the above described disadvantages of the conventional techniques.

Therefore it is the object of the present invention to provide a vacuum absorption device for use in a glass sheet chamfering apparatus, in which the introduction of foreign materials is prevented by providing a rubber plate and an actuation plate so as for the glass sheet to be absorption-secured, and in which height adjustments are made possible by threadably coupling the cylindrical body with a flange of the positional adjusting plate.

BRIEF DESCRIPTION OF THE DRAWINGS

The above object and other advantages of the present invention will become more apparent by describing in detail the preforred embodiment of the present invention with reference to the attached drawings in which:

FIG. 3 illustrates in a sectional view an assembling relations of the absorption device according to the present invention.

DESCRIPTION OF THE PREFERRED EMBODIMENT

Figure 1:
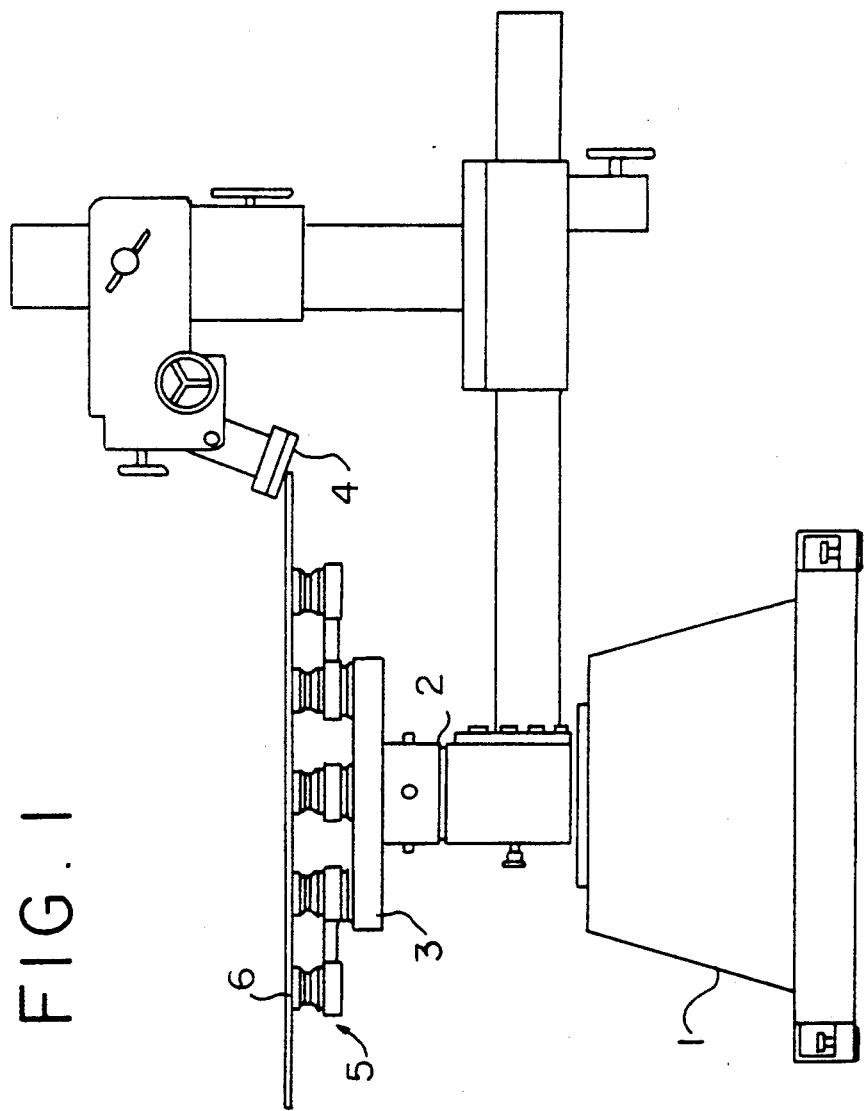
FIG. 1 is a frontal view of a conventional chamfering apparatus including vacuum absorption devices.
Figure 2A:
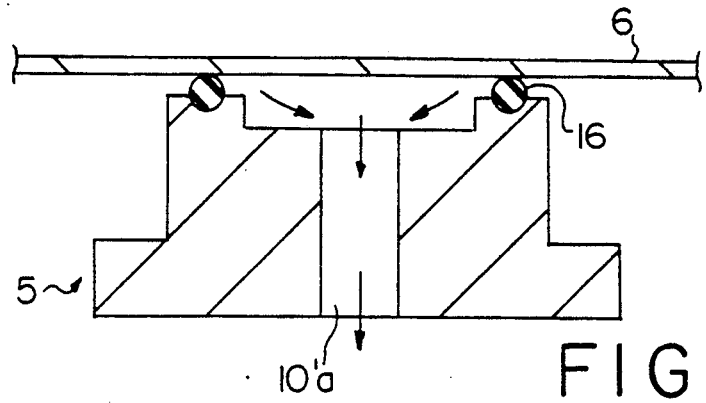
FIGS. 2A and 2B are sectional views of the conventional absorption devices.
Figure 2B:
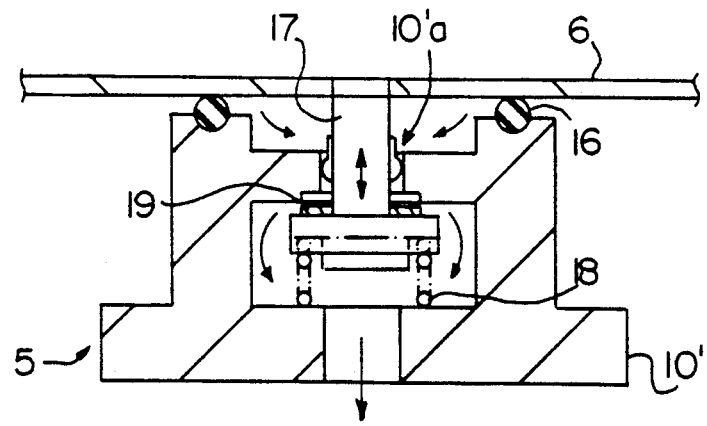

As shown in FIG. 3, the overall constitution of the vacuum absorption device according to the present invention is such that a cylindrical flange 9, a cylindrical body 10, a spring 13 and a W shaped rubber plate 11 having an actuation plate 12 on the bottom thereof are coupled on a positional adjusting plate 8 in the cited order, thereby forming an absorption device 5.

A fitting hole 8b formed at a side portion of the positional adjusting plate 8 communicates with an internal suction passage 8a, and a projected portion 9a formed on the bottom of the cylindrical flange 9 is inserted into the fitting hole 8b, the projected portion 9a being firmly secured by means of a bolt 9'. A step 9b is formed within the cylindrical flange 9, and a thread portion is formed on the upper portion thereof.

The cylindrical body 10 which is threadably coupled within the cylindrical flange 9 is provided with a suction hole 10c, the suction hole 10c being formed toward the interior of the lower projected portion 10a, while, above the suction hole 10c, there are provided a stopper 10f, a settling recess 10e, having an inclined side wall, and an annular groove 10d for insertion of the spring 13. Further above thereof, there are formed mounting groove 10i on which mounting protrusion 11a of the W shaped rubber plate 11 is mounted.

On the external circumferential surface of the cylindrical body, there is formed a thread section which is to be coupled with the internal threads of the cylindrical flange 9, and about the upper portion of the thread section, there is formed a guide groove 10h by a rim portion 10b.

The W shaped rubber plate 11 which is inserted into the cylindrical body 10 together with the spring 13 is provided with a annular mounting protrusion 11a adjacent the opposite lip 11c thereof, so that they can be inserted into the mounting groove 10. The bottom of the W shaped rubber plate 11 is provided with a gently curved section 11b, and is coupled with an actuation plate 12 made of a metal. The actuation plate 12 has inclined side portion, and the bottom thereof is provided with a projection 12a.

The device of the present invention constituted as described above is assembled in such a manner that; The projected portion 9a formed on the bottom of the flange 9 is inserted into the fitting hole 8b of the positional adjusting plate 8; the projected portion 9a is fastened by means of a bolt 9'; the cylindrical body 10 is threadably coupled with the flange 9 by turning the cylindrical body 10 in such a manner that there should be remained gaps α, β between the ceiling of the guide groove 10h and the top of the flange 9 and between the step 10g and the step 9b; a spring is inserted into the annular groove 10d of the cylindrical body 10; the projection 12a of the actuation plate 12, which is attached on the bottom of the rubber plate 11, is inserted into the upper portion of the spring 13; and the rubber plate 11 is secured by inserting the mounting jaws 11a into the mounting groove 10i.

Reference codes 14, 15 in the drawing indicate O-rings, and reference code 7 indicates a support for securing the absorption devices to the rotary table.

The device of the present invention assembled in the manner described above will now be described as to its operations and effects.

If the user mounts a glass sheet 6 on the absorption device 5, the glass sheet 6 is closely contacted onto the edge portions of the rubber plate 11, which is protruded above the cylindrical body 10.

Figure 4:
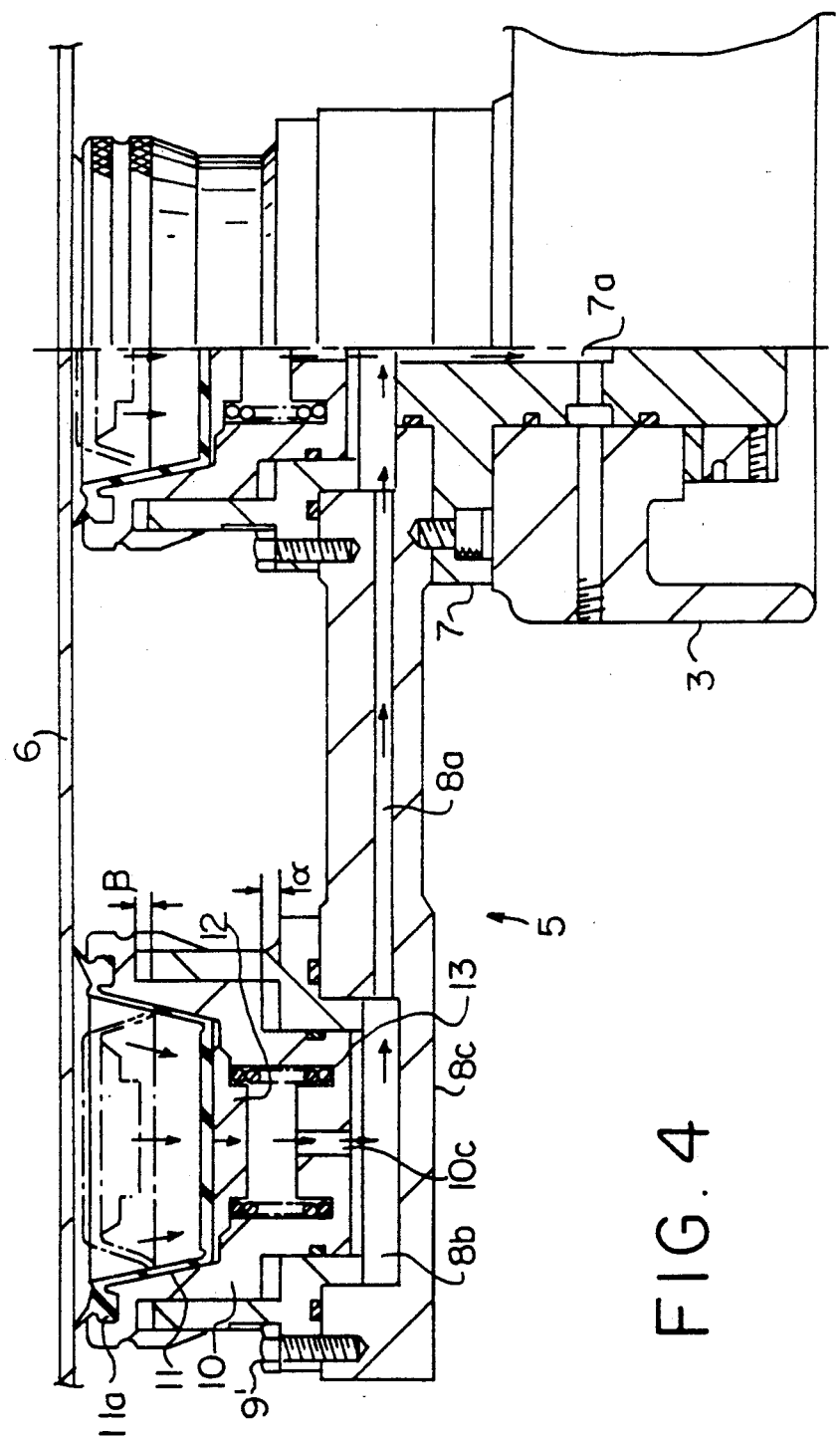
FIG. 4 illustrates in a sectional view the operating state of the absorption device according to the present invention.

Under this condition, if the absorption pump is activated as shown in FIG. 4, then the suction force of the absorption pump is transmitted through suction paths 7a, 8a of the support 7 and the positional adjusting plate 8 to the suction holes 10c of the cylindrical body 10, thereby pulling the rubber plate 11.

Accordingly, the gently curved section 11b of the rubber plate 11 is spread, and is deformed from the shape shown by the imaginary line to the shape shown by the solid line. Therefore the area of the contact between the rubber plate and the glass sheet is suddenly expanded to create a vacuum space. As a result, the glass sheet 6 is firmly attached to the rubber plate 11 to be absorption-secured thereon. At the same time, the spring 13 is compressed, and if the actuation plate 12 is stopped by the stopper 10f, it can not go down further, thereby stopping the movement.

Meanwhile, after the completion of the chamfering, the operation of the absorption pump is stopped, and the glass sheet 6 is taken out from the absorption device 5.

If the rubber plate 11 is worn out or contracted after a long use, the horizontal posture of the glass sheet 6 will be deviated, and in such a case, the deviation can be corrected by adjusting the heights of the respective absorption devices 5 through turning of the cylindrical bodies 10 reading the scales (not shown).

As described above, according to the present invention, a rubber plate 11 is installed within a cylindrical body 10 of the absorption device 5, and the glass sheet is absorption-secured through the deformation of the rubber plate 11, thereby preventing the chamfered glass powders and the diamond powders from being introduced into the cooling water. This bring the result that the life expectancy of the absorption pump is extended, and the deterioration of the performance can be prevented. Further, owing to the fact that the height of the absorption device can be adjusted by turning the cylindrical body relative to the flange 9, the chamfering defects of the glass sheets due to the wearing-out or contraction of the rubber plate can be prevented, thereby contributing to improving the product quality and the productivity.

What is claimed is:

1. A vacuum absorption device for use in glass sheet chamfering apparatus and installed on a positional adjusting plate connected to a rotary table of chamfering apparatus, comprising:
    a cylindrical flange provided with a step and a thread section on the inner circumferential surface thereof, and for being fitted into a fitting hole of said positional adjusting plate;
    a cylindrical body provided with a thread section on the outer circumferential surface thereof and with a settling recess, an insertion groove and a suction hole on the inside thereof, and mounting groove on the top thereof, and for being threadably coupled with the thread section of said flange; and
    a rubber plate provided with:
        a bottom,
        an actuation plate coupled with the rubber plate bottom,
        a continuous generally annular portion including mounting jaws received in the mounting groove of the cylindrical body, the annular portion including an annular lip located adjacent the mounting jaws and engageable with a workpiece; and
        a gently curved portion coupled to the rubber plate bottom to allow movement of the bottom and the actuation plate into the settling recess upon actuation of vacuum producing means that may be coupled to the suction hole,
    the above components being coupled to each other in a vertical form.

* * * * *